A. C. EASTWOOD.
ELECTRIC CONTROLLER.
APPLICATION FILED JAN. 7, 1911.

1,014,625.

Patented Jan. 9, 1912.
2 SHEETS—SHEET 1.

FIG. 1

WITNESSES

INVENTOR
A. C. Eastwood
by F. N. Barber
attorney.

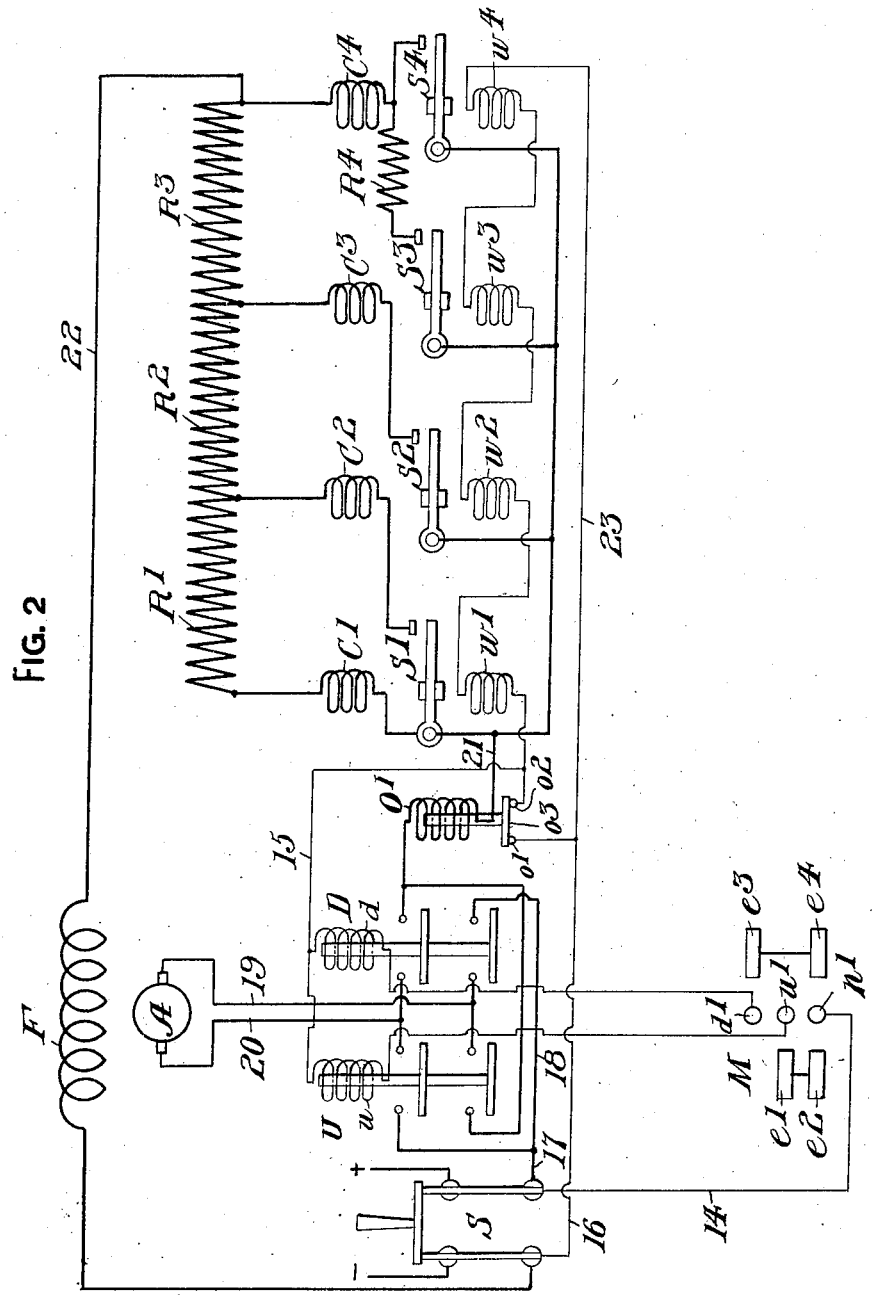

UNITED STATES PATENT OFFICE.

ARTHUR C. EASTWOOD, OF CLEVELAND, OHIO, ASSIGNOR TO THE ELECTRIC CONTROLLER AND MANUFACTURING COMPANY, OF CLEVELAND, OHIO, A CORPORATION OF OHIO.

ELECTRIC CONTROLLER.

1,014,625.  Specification of Letters Patent.  Patented Jan. 9, 1912.

Original application filed September 22, 1910, Serial No. 583,301. Divided and this application filed January 7, 1911. Serial No. 601,334.

*To all whom it may concern:*

Be it known that I, ARTHUR C. EASTWOOD, a citizen of the United States, residing at Cleveland, in the county of Cuyahoga and State of Ohio, have invented new and useful Improvements in Electric Controllers, of which the following is a specification.

My invention relates to improvements in electric controllers in which the various connections for controlling the speed of the motor are effected by individual magnetically-operated switches.

One of the objects of my invention is to obviate the necessity of winding the coils of the switch-operating magnets with such fine wire as has been the practice.

Another object is to provide means for electrically interlocking the switches which control the speed of the motor without the use of the usual auxiliary contacts.

Other objects are to simplify and cheapen greatly the construction of the type of controller to which it relates; to render the connections and operation of the controller more readily understood by those entrusted with its care, and to make it much more reliable and satisfactory in service.

Referring to the accompanying drawings, Figures 1 and 2 are diagrammatic views, showing two of the many forms which my invention may assume.

Referring now to Fig. 1, S is the main switch for connecting the motor and controller to the two sides of a supply circuit; A is the armature of the motor; and $f$ is the shunt-field winding which is connected across the positive and negative sides of the switch S; $R'$, $R^2$, $R^3$, and $R^4$ are sections of resistance connected in multiple for controlling the flow of current to the motor. The sections $R'$ to $R^4$ of resistance are controlled, respectively, by the switches $S'$, $S^2$, $S^3$ and $S^4$, these switches having the operating or closing windings $C'$, $C^2$, $C^3$ and $C^4$, respectively, and the locking-out windings $w'$, $w^2$, $w^3$, and $w^4$, respectively. I have also shown associated with the operating windings of the switches shunts designated, respectively, as $p'$, $p^2$, $p^3$, and $p^4$.

O is an acceleration relay which governs the time of closure of the successive switches. It will be seen that the locking out coils $w'$, $w^2$, $w^3$, and $w^4$ are connected in series, the circuit of this series passing through the contacts of the acceleration relay O. The relay is so adjusted that when a predetermined current passes through its winding which is in the motor circuit, it will raise its plunger so that its contact member $o^3$ will span the contacts $o'$ and $o^2$, thus closing the circuit through the locking-out coils $w'$ to $w^4$. Consequently, if the current taken by the motor is below the value for which the relay is adjusted, the locking-out coils will not be energized, and the switches will be free to close consecutively. If, however, during the process of starting the motor, the motor current exceeds the predetermined value, the locking-out coils will be energized, when the relay lifts its plunger, and further progressive closure of the switches will be arrested.

Assuming that the switch S is closed a circuit is made from the positive side of the switch S through the wire 1, the shunt-field winding $f$, and the wire 2 to the negative side of the switch S, thus energizing the shunt field. At the same time a second circuit is established from the positive side of the switch S through the winding of the relay O, the wire 3, the operating winding $C'$ of the switch $S'$, the resistance section $R'$, the wire 4, the armature A, and the wire 2 to the negative side of the switch S. The circuit of the motor is complete with the resistance section $R'$ in series therewith, and the operating winding $C'$ of the resistance switch $S'$ is also in series with this circuit which may be designated as the controlled circuit. This circuit tends to cause the switch $S'$ to close, and it will close providing the current is not excessive. When switch $S'$ closes, a branch circuit is established from the positive side of the switch S through the winding of the relay O, the wire 3, the contacts of the switch $S'$, and the winding $C^2$ of the switch $S^2$, the resistance section $R^2$, the wire 4, the armature A, and the wire 2 to the negative side of the switch S, which branch circuit places the resistance $R^2$ in parallel with the resistance $R'$, the two resistances in parallel being in series with the armature A. If the current is excessive, that is, above a predetermined value, the relay O raises its plunger, closing the circuit of the locking-out coils, so that, notwithstanding the fact that the winding $C^2$ of the switch $S^2$ is energized, the switch $S^2$ cannot close. When the current of the motor drops to the said predetermined value, the relay drops its plunger, causing the locking-out coils to be deënergized, whereupon the switch $S^2$ immediately closes. The switch $S^2$ in closing closes a circuit from the wire 5, through the wire 6, the operating winding $C^3$ of the switch $S^3$, and the resistance section $R^3$. The resistances $R'$, $R^2$, and $R^3$ are connected in parallel, the three resistances in parallel being in series with the armature A. In case the motor current is above a predetermined value, the relay O closes its contacts, causing the locking coils to be energized, and the switch $S^3$ to remain open, as will be readily understood from the description herein relative to the action of the relay in connection with the locking coils and the switch $S^2$. When the motor current again drops to the said predetermined value, the switch $S^3$ closes and in closing closes a circuit from the wire 5, through the wire 7, the contacts of the switch $S^3$, the operating winding $C^4$ of the switch $S^4$, and the resistance section $R^4$ to the wire 4, thus placing the resistance sections $R'$, $R^2$, $R^3$, and $R^4$ in parallel. This leaves the operating winding $C^4$ of the switch $S^4$ energized. In case the motor current is above a predetermined value, the relay O operates, as already described, to close the circuit of the locking coils and prevent the closing of the switch $S^4$. When the motor current falls to the predetermined value the switch $S^4$ closes, thus creating another circuit from the wire 5 directly through the contacts of the switch $S^4$, the maintaining winding $C'^4$, and the wire 9 to the armature A of the motor, which circuit short-circuits all of the resistance, and permits the motor to operate at full speed. Since the path from the wire 5 through the contacts of the switch $S^4$, its maintaining winding $C'^4$, and the wire 9 is of very low resistance, practically no current passes through the resistance sections $R'$, $R^2$, $R^3$, and $R^4$, and the switch-operating windings $C'$, $C^2$, and $C^3$, associated therewith, and therefore, these switches open and the circuit through the motor is then maintained entirely through the switch $S^4$.

When it is desired to stop the motor, the main circuit is opened at the switch S, which, of course, deënergizes the winding $C'^4$ of the switch $S^4$, causing this switch to open. I have shown in this figure the shunts $p'$, $p^2$, $p^3$, and $p^4$ associated with the windings $C'$, $C^2$, $C^3$, and $C^4$, respectively, the purpose of these shunts being to adapt a given standard operating winding for use with motors varying in their ampere capacity, the variation in capacity being taken care of by the resistance of the shunt. Assuming, for instance, that the various operating coils $C'$ to $C^4$ are wound for a capacity of 20 amperes, they can be used without shunts on a motor which requires 20 amperes of current. The same coils, however, can be applied to a motor having a capacity of 40 amperes by making the resistance of the shunts such that one-half of the motor current will pass through the operating winding.

I have shown the switch $S^4$ provided with two windings marked $C^4$ and $C'^4$ respectively. The winding $C^4$ is energized by closure of the switch $S^3$, and may be termed the operating winding. The winding $C'^4$ is energized through the closure of the switch $S^4$, and may be termed a maintaining winding. These two windings have been introduced for the reason that, if the winding $C'^4$ were not provided, and the stationary terminal of the switch $S^4$ were connected directly to the wire 9 and to the armature, the winding $C^4$ would be short-circuited when the switch closes, which would tend to cause the switch $S^4$ to immediately open.

Referring now to Fig. 2, S is a main switch, as before, while A is the armature; and F, the series field winding of the motor. $R'$, $R^2$, and $R^3$ are sections of resistance which differ in arrangement from the resistances shown in Fig. 1 in that the sections of resistance are connected in series when the motor is started.

D and U constitute reversing switches, operated, respectively, by electro-magnets having windings $d$ and $u$. The reversing switch D is operated to give one direction of rotation of the armature of the motor, and the reversing switch U is operated to give the reverse motion in the well known manner.

I have shown a relay $O'$ responsive to the motor current for governing the circuit of the locking-out windings $w'$, $w^2$, $w^3$, and $w^4$, as in Fig. 1.

M is a master switch which may be used for starting, stopping, and reversing the motor.

Assuming that the barrel of the master controller is moved toward the left so as to bring the contact fingers $d'$ and $n'$ into contact with the respective segments $e^3$ and $e^4$, a circuit will then be established as follows: from the positive side of the switch S to the wire 14, the contact finger $n'$, the contact strips $e^4$ and $e^3$, the contact finger $d'$, the winding $d$ of the reversing switch D, the wire 15, the contacts $o^2$, $o^3$, and $o'$ of the acceleration-relay $O'$, and the wire 16 to the negative side of the switch S. This completes the circuit through the winding $d$, which causes the switch D to lift its plunger, which in turn completes the main motor-circuit as follows: from the positive side of the switch S through the wire 17, the wire 18, the lower contacts of the reversing switch D, the wire 19, the armature A, the wire 20, the upper contacts of the reversing switch D, the winding of the relay O', the wire 21, the winding c' of the switch S', the resistance sections R', R², and R³, the wire 22, and the series field F to the negative side of the switch S, thus completing the circuit through the motor. The switch S', when it closes, closes a circuit through the operating winding C² of the switch S², which in turn closes a circuit through the winding C³ of the switch S³, while the switch S³ in closing closes a circuit through the winding C⁴ of the switch S⁴.

If an excessive motor current does not flow when the reversing switch D closes, the relay O' will rest on its contacts, and all the locking coils $w'$, $w^2$, $w^3$, and $w^4$ are short-circuited. If, however, an excessive current should flow through the motor, the relay would raise its contacts and all of the locking coils would then be energized through the following circuit; from the positive side of the switch S, through the wire 14, the contact finger $n'$ of the master switch, the contact finger $d'$, the winding $d$ of the reversing switch D, the wire 15, the windings $w'$, $w^2$, $w^3$, and $w^4$ in series, the wire 23, and the wire 16 to the negative side of the switch S. The closure of the switch S' is prevented until the motor current has been reduced by the speeding up of the motor, at which time the relay O' will drop its plunger, thus short-circuiting the locking windings, and permitting the switch S' to close. If the closure of this switch produces an excessive current the plunger of the relay will then rise, again energizing the locking windings and preventing closure of the switch S². The closure of the switches S³ and S⁴ is governed in a similar manner.

When it is desired to stop the motor, the master switch is moved to the off position, which deënergizes the winding $d$ of the reversing switch D, causing the same to open, and thus open the circuit through the motor and through the operating winding C⁴ of the switch S⁴, which causes the switch S⁴ also to open.

When it is desired to start the motor in the reverse direction, the master switch is moved to the right, bringing the contact fingers $n'$ and $u'$ into contact with the corresponding strips $e'$ and $e^2$. This closes a circuit which energizes the winding $u$, causing the reversing switch U to close. This reversing switch is so connected as to reverse the direction of current flow through the armature of the motor, causing the armature to reverse its direction of rotation in the well known and obvious way. The subsequent closure of the switches S' to S⁴ is automatically governed, as previously described.

In Figs. 1 and 2, the resistance controlling switches S' to S⁴ are held closed by all or a portion of the motor current, and these switches may readily be so proportioned that they will remain closed until the current through their windings has been reduced to almost zero.

In ordinary operation the opening of the motor circuit in the embodiment shown in Fig. 1 takes place at the contacts of the switch S, while in Fig. 2 the circuit is normally opened at the contacts of one or the other of the reversing switches D or U. It is evident, therefore, that substantially all of the arcing which takes place in the operation of these controllers occurs at the contacts of the switches at which the circuit of the motor is normally opened and that under no conditions will there be any arcing of a serious nature at the contacts of the resistance controlling switches. Therefore, in addition to the elimination of auxiliary circuit contacts in connection with the several resistance switches, my invention also provides means whereby the necessity of blowout magnets and elaborate arc-breaking arrangements is obviated in connection with the resistance switches.

This application is a division of my application Serial Number 583,301 filed September 22, 1910.

I claim—

1. In an electric controller, a series of magnetically-operated switches, each of said switches having its operating winding arranged to be included in the controlled circuit by the closing of a preceding switch, a locking winding arranged to prevent the closing of each of the said switches, and a relay responsive to the current in the controlled circuit for controlling said locking windings.

2. In an electric controller, a series of electro-magnetically operated switches, successively-energized windings adapted when energized to cause the successive closing of the said switches, a locking winding for each switch, each of said locking windings adapted when energized to prevent its respective switch from closing, and means responsive to the current in the controlled circuit for controlling said locking windings.

3. In a controller for electric motors, a resistance, means for closing the circuit through the said motor and the said resistance, a series of switches for controlling the amount of the said resistance in the motor circuit, each of said switches except the first having an operating winding included in the circuit closed at the main contacts of the switch which precedes it in operation, a locking winding for each switch for preventing the operation of the said switch, and a relay governed by the current in the motor circuit for controlling the locking windings.

4. In an electric controller, a controlled circuit, a series of switches arranged to close in a predetermined order, each of the said switches having an actuating winding included in the controlled circuit by the closure of the switch which precedes it in operation, the last of the said switches having a maintaining winding included in the controlled circuit by the closure of the said switch.

5. In an electric controller, a controlled circuit, a series of switches arranged to close in a predetermined order, each of the said switches having an actuating winding included in the controlled circuit by the closure of the preceding switch, the last of the said switches having its contacts connected to close a path including a maintaining winding for said last switch, said path short-circuiting or shunting the actuating windings of all of said switches.

Signed at Cleveland, Ohio, this 3rd day of January A. D. 1911.

ARTHUR C. EASTWOOD.

Witnesses:
H. M. Diemer,
R. D. Wright.